United States Patent [19]
Kranz

[11] Patent Number: 5,678,754
[45] Date of Patent: Oct. 21, 1997

[54] ENVELOPE WITH DUAL POCKETS

[75] Inventor: Richard Kranz, Leawood, Kans.

[73] Assignee: Tension Envelope Corporation, Kansas City, Mo.

[21] Appl. No.: 572,496

[22] Filed: Dec. 14, 1995

[51] Int. Cl.$^6$ ................................................ B65D 27/08
[52] U.S. Cl. ............... 229/72; 229/117.04; 229/117.06; 229/67.3; 229/67.4; 383/38; 383/120
[58] Field of Search ........................... 229/68.1, 928, 229/117.03, 117.04, 117.05, 117.06, 72, 67.1, 67.2, 67.3, 67.4; 383/38, 120

[56] References Cited

U.S. PATENT DOCUMENTS

| | | | |
|---|---|---|---|
| 930,837 | 8/1909 | Bushnell, Jr. | 229/67.3 |
| 1,304,145 | 5/1919 | Belcher | 229/72 |
| 1,734,642 | 11/1929 | Olm | 229/67.3 |
| 2,188,730 | 1/1940 | Swab | 229/67.3 |
| 2,460,909 | 2/1949 | Shaffer | 229/67.3 |
| 2,931,558 | 4/1960 | Zalkind | 229/72 |
| 2,945,617 | 7/1960 | Normandin | 229/67.3 |
| 3,073,508 | 1/1963 | Hiersteiner | 229/67.3 |
| 3,286,907 | 11/1966 | Crane | 229/117.06 |
| 4,411,373 | 10/1983 | Kupersmit | 229/117.04 |

FOREIGN PATENT DOCUMENTS

| | | | |
|---|---|---|---|
| 311824 | 4/1989 | European Pat. Off. | 383/120 |
| 2338 | 8/1905 | United Kingdom | 383/38 |

Primary Examiner—Stephen P. Garbe
Attorney, Agent, or Firm—Litman, McMahon and Brown, L.L.C.

[57] ABSTRACT

An envelope includes a front panel and a rear panel with a closure flap. The front and rear panels are connected by an expandable sidewalls formed by joining end flaps of the front and rear panel. The sidewalls have an intermediate line of weakness that allows bending and expansion. The line of weakness is backed on the inside by an extension from the front panel flap which reduces the likelihood of the sidewall being turned outwardly rather than inwardly into the envelope. A front to rear strip connects the front panel with the back panel so as to form a relatively small pocket and a relatively large pocket within the envelope. A locking tab is preferentially placed above the small pocket and constructed of extensions of the front panel and sidewall to allow a user to selectively use the locking tab to hold objects within the small pocket or release such objects. The envelope is especially suited for transferring finished photographic prints and a container holding negatives for the prints.

13 Claims, 3 Drawing Sheets

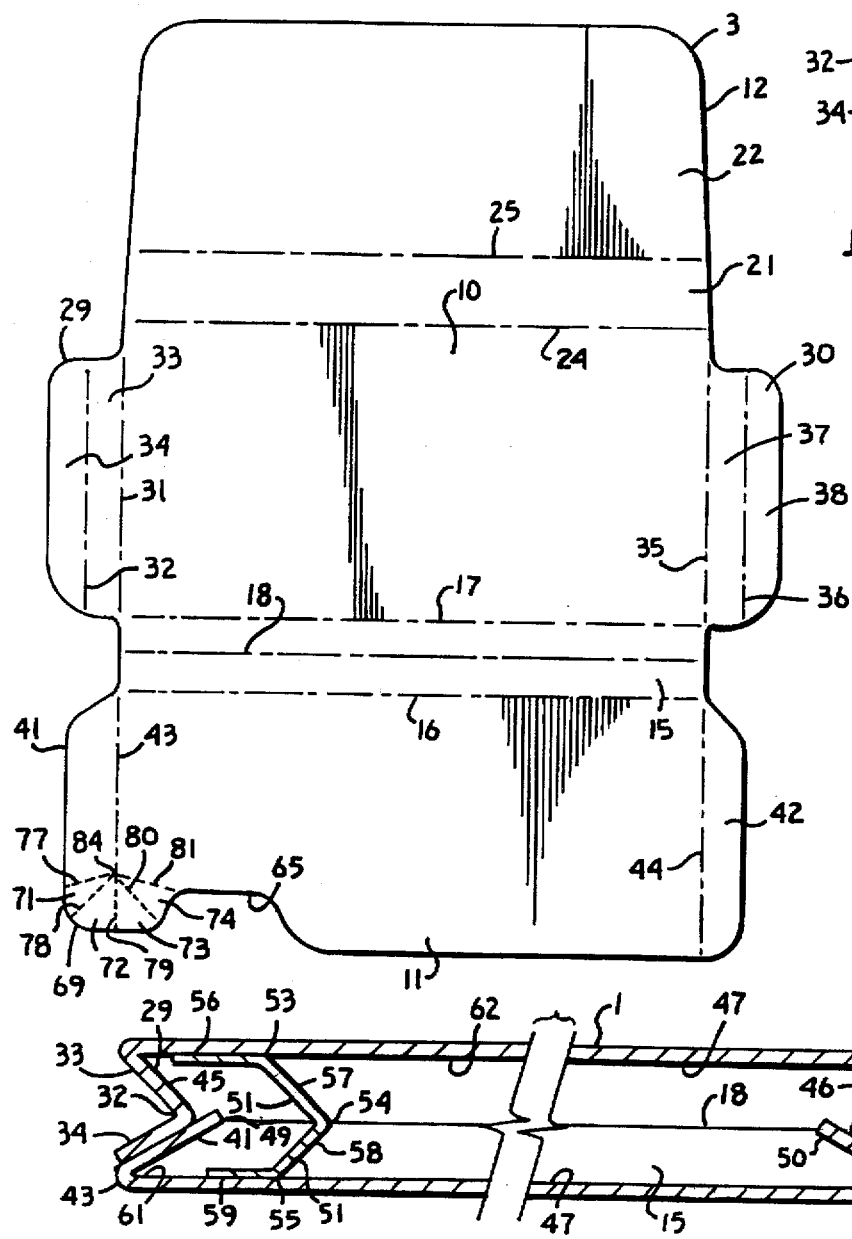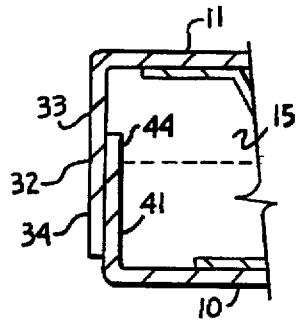

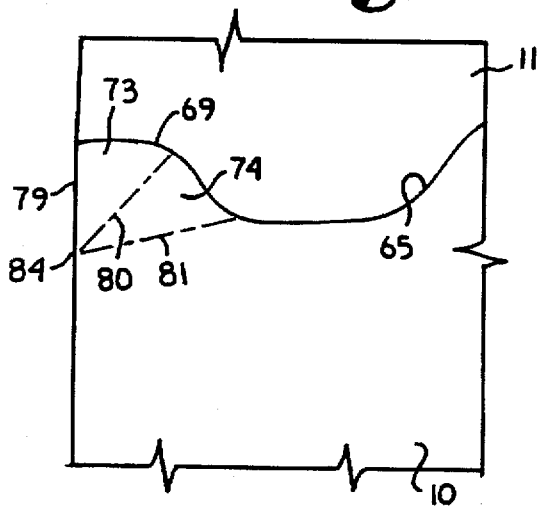
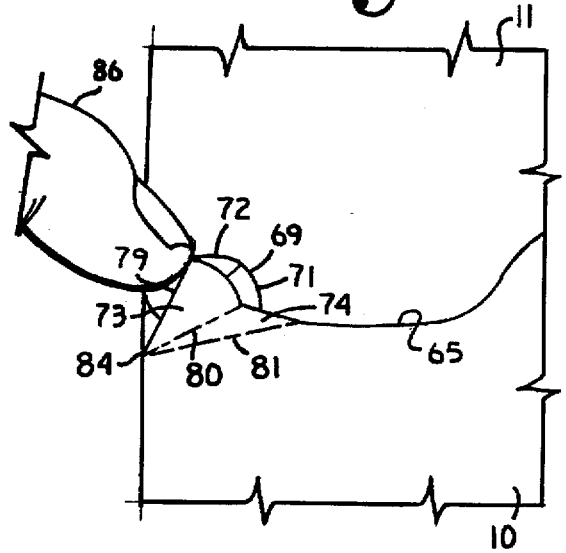
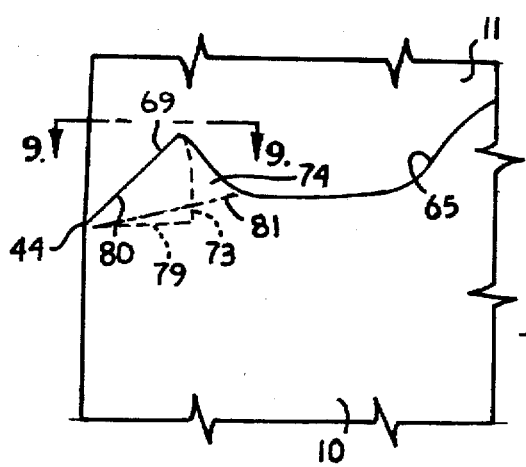
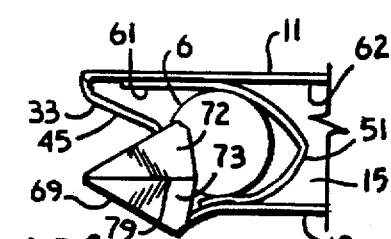
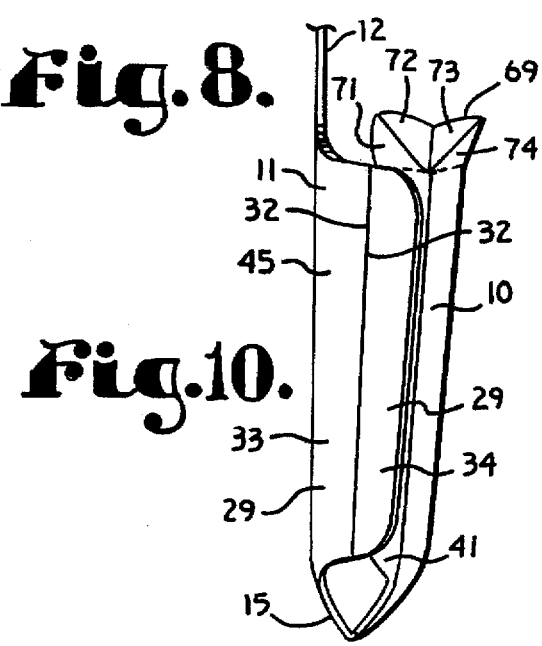
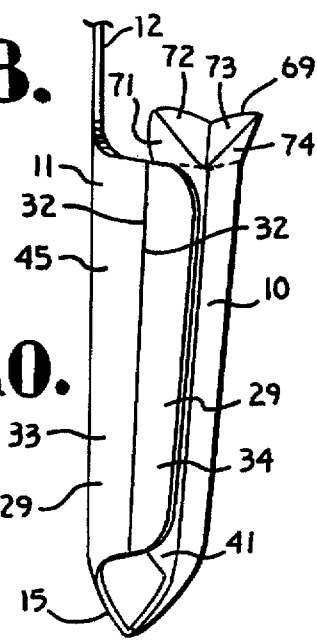

ENVELOPE WITH DUAL POCKETS

BACKGROUND OF THE INVENTION

The present invention is directed to an expandable envelope having two pockets and including a keeper for maintaining articles in one of the pockets.

The photographic industry has historically utilized an envelope or packet for holding the photographic negatives and developed photographic prints of a customer and to allow the photographic printer to easily and simply turn over the prints and negatives to the customer. Historically, envelopes with a single large pocket or with an end to end divider down the center of the envelope forming a pair of side to side pockets have received both the negatives cut in strips and the photographs in a side by side configuration.

The photographic industry is currently planning to change the manner in which some photographs will be returned to a customer. That is, while some photographs will be continued to be developed and returned to customers in the same manner as in the past, a certain growing percentage of photographs will not. In particular, there appears to be a developing trend toward returning negatives to a customer in a wound spool that is inserted in a canister or tube suitable for holding negatives in a roll. That is, negatives will be in a continuous strip and rolled, rather than cut into short strips containing just a few negatives each and left flat. In some of the future formats, these rolls of negatives may contain many more than the current rolls of film, for example 100 negatives or more.

The present envelopes for receiving pictures and negatives are generally unsuited for the new format in that the container or canister for the rolled negatives is somewhat cumbersome and tends to fall out of the conventional envelopes. Furthermore, the roll tends to push against the expandable joint at the ends of the envelope and invert that joint so that the end of the envelope sticks outwardly rather than inwardly into the envelope. This impedes insertion of the envelope into a larger outside container or cover, as is often utilized.

Consequently, it is desirable to have an envelope that is suitable for the photographic business and, in particular for returning completed prints and underlining negatives in a roll to a customer in a single envelope.

SUMMARY OF THE INVENTION

An envelope includes a front panel and a rear panel connected at the bottom thereof so as to form an enclosure. An expandable end wall is formed by extensions of the front and rear panels on either side thereof.

The expandable end walls are formed by a double folded flap forming inner and outer portions joined to the back panel and a flap joined to the front panel which allow folding inward of the end wall relative to the remainder of the envelope. In particular, the end wall is formed by joining the outer portion of the rear wall flap to the front wall flap. However, the front wall flap is constructed to be somewhat wider than the outer portion of the rear wall flap to which it is attached and is positioned inward of the rear wall flap outer portion, so as to extend over a foldable joint between the two rear wall flap portions. This reinforces the foldable joint of the sidewall to help prevent it from being pushed outwardly as opposed to the normal and desired position of folding inwardly toward the center of the envelope or being fully open.

The front and rear panels are connected by an upright front to rear flap which is positioned intermittently between the two end walls, but closer to one of the end walls than the other. The flap thereby divides the interior of the envelope into a first comparatively smaller pocket and a second larger pocket.

The end wall on the side of the envelope associated with the smaller pocket and an adjacent portion of the front panel extend above the smaller pocket and include a series of lines of weakness which allow cooperative folding of the upper corner of the front panel and the upper end of the end wall from a configuration wherein the smaller pocket is open and an object may be placed into the smaller pocket to a configuration wherein the smaller pocket is at least partially closed and an object is maintained in the smaller pocket.

In particular, a locking tab is formed which extends over the smaller pocket. The locking tab includes four triangular shaped elements, two adjacent elements from the front panel and two adjacent elements from the end wall flap associated with the front panel which are foldably joined along one edge thereof. The locking tab is constructed in such a manner that lines of weakness separate and define the triangular elements and allow folding in such a manner that when the locking tab is moved into the locking configuration thereof, the front and back panels tend to hold the tab in the locked configuration and prevent an object falling from the smaller pocket. However, a person may expand the front and rear panels manually and use their finger to easily move the locking tab between the opened and locked configurations thereof.

The envelope includes a cover panel which is attached to the rear panel and which extends over the top of the envelope to enclose the small and large pockets from the top.

The envelope is especially useful for storing and transporting finished photographs in the large pocket and a container holding negatives in a rolled configuration within the smaller pocket.

OBJECTS AND ADVANTAGES OF THE INVENTION

Therefore the objects of the present invention are to provide an envelope having a relatively large interior pocket and a separate relatively small interior pocket, separated by a front to rear wall especially an envelope suited for receiving completed photographic pictures in the larger pocket and a container containing rolled photographic negatives in the smaller pocket; to provide such an envelope having a front panel and a rear panel connected by expandable sidewalls formed of interconnected flaps extending from the front panel and the rear panel; to provide such an envelope wherein the expandable sidewalls are formed by joining a rear panel side flap having a line of weakness separating the rear panel flap into a first inner segment and an outer second segment and a front panel side flap such that the front panel side flap is fixed to the second segment; to provide such an envelope wherein the front panel side flap is longer than the rear panel side flap second segment and positioned inwardly thereof relative to the envelope so as to extend beyond the link of weakness separating the rear panel flap first and second segments so as to reenforce the sidewall against outward folding thereof; to provide such an envelope having an integral tab at the upper end of the corner of the front panel and the front panel side flap that is manually foldable between a locking position wherein a locking tab is formed over the envelope small pocket to maintain an item in the small pocket and a non locking or open configuration wherein the tab is upright to allow removal from or placement of objects into the small pocket; and to provide such an envelope which is relatively easy to make, inexpensive to produce and especially well suited for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a front elevational view of an envelope blank for use in accordance with the present invention with all parts of the envelope blank in a non folded configuration subsequent to manufacture of the blank.

FIG. 4 is an enlarged and fragmentary cross sectional view of the envelope, taken along line 4—4 of FIG. 3.

FIG. 5 is an enlarged and fragmentary cross sectional view of the envelope, as shown in FIG. 4, with the envelope fully expanded.

FIG. 6 is an enlarged and fragmentary front elevational view of the envelope with the locking tab in an unlocked configuration thereof.

FIG. 7 is an enlarged and fragmentary front elevational view of the envelope with the locking tab shown being manually moved between the unlocked configuration thereof and locked configuration thereof.

FIG. 8 is a front elevational view of the envelope illustrating the locking tab in the locked configuration thereof.

FIG. 9 is a fragmentary cross sectional view of the envelope showing the locking tab in the locked configuration thereof, taken along line 9—9 of FIG. 8.

FIG. 10 is a fragmentary side elevational view of the envelope showing the cover flap in the opened configuration thereof and with the locking tab in the locked configuration thereof.

DETAILED DESCRIPTION OF THE INVENTION

Figure 2:
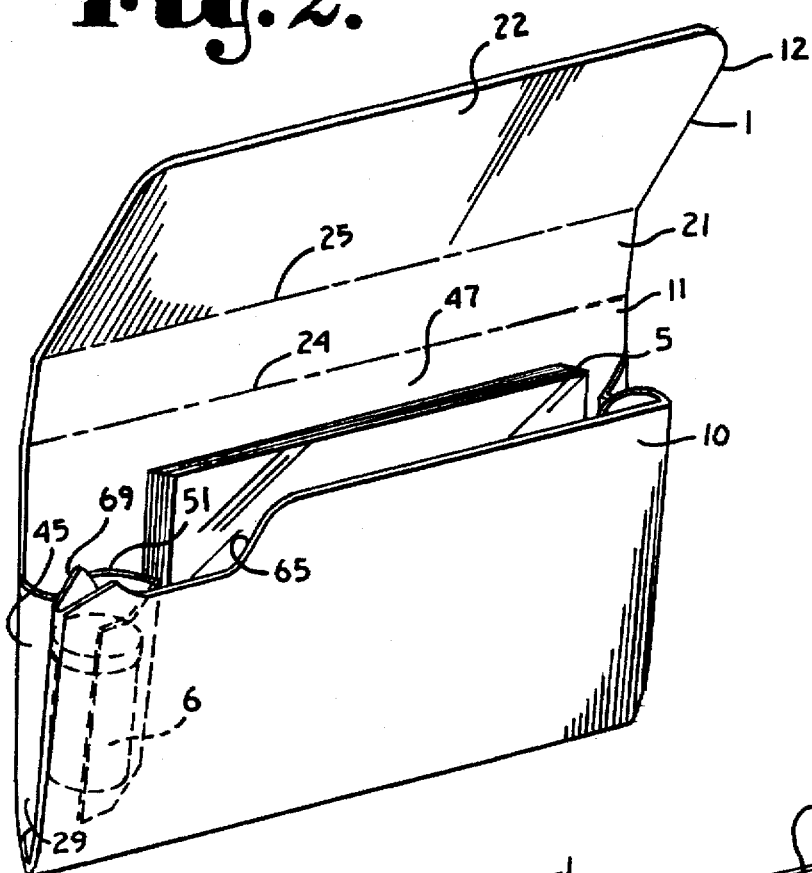
FIG. 2 is a perspective view of the envelope subsequent to construction of the envelope from the blank of FIG. 1 and showing the envelope with the top flap thereof open and containing a set of photographs in a large pocket thereof, and also showing a container for containing negatives in phantom lines in a small pocket thereof with a locking tab holding the container in the small pocket.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally designates an envelope in accordance with the present invention. A cut envelope blank 3 is illustrated in FIG. 1 from which the envelope 1 is manufactured.

With reference to FIG. 1, the envelope blank 3 is constructed by well known methods of cutting from a larger single piece of paper stock and various lines of weakness which facilitate folding along the lines formed on the envelope blank 3 by conventional and well known methods.

With reference to FIG. 2 the envelope 1 is constructed to enclose photographs 5 and a canister or cylindrical container 6 which holds film negatives (not shown) in a roll.

Figure 3:
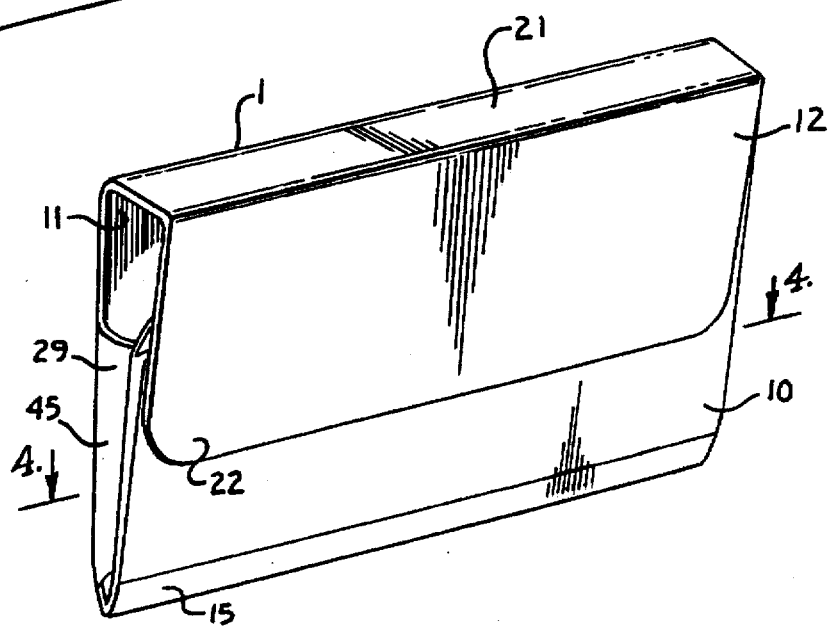
FIG. 3 is a perspective view of the envelope shown in FIG. 2 with the closure flap in a closed configuration thereof.

The envelope 1, as seen in FIGS. 2 and 3 includes a front panel 10, a rear panel 11 and a closure flap 12. The front panel and rear panel are connected near a lower end thereof (as seen in FIGS. 2 and 4) by a bottom strip 15. The bottom strip 15 is joined along each side thereof to the front panel 10 and rear panel 11 at lines of weakness 16 and 17 respectively. There is also a center line of weakness 18 in the bottom strip 15 which runs parallel to the lines of weakness 16 and 17. The strip 15 folds or bends at the lines 16, 17 and 18 to allow expansion or compression of the envelope 1, that is, greater spacing between or less spacing between the front panel 10 and rear panel 11, respectively.

The front panel 10 and rear panel 11 are generally rectangular in shape and are relatively parallel to one another when the envelope is completed such as is shown in FIG. 2.

The closure flap 12 is attached to the upper side of the rear panel 11 opposite the bottom strip 15. The closure flap includes a top section 21 and a front cover section 22. The flap top section 21 is connected to the rear panel 11 at a line of weakness 24. The top section 21 and cover section 22 are likewise connected at a line of weakness 25. The line of weakness 25 allows folding therealong so that the closure flap 12 may be folded from an open configuration thereof, as is seen in FIG. 2, to a closed configuration thereof, as is seen in FIG. 3, while the line of weakness 25 likewise allows folding of the top section 21 so as to be folded further relative to the cover section 22 to allow the entire closure flap 12 to move into the closed configuration, as seen in FIG. 3.

Extending laterally outward from each side of the rear panel 11 when the envelope is still in the blank 3 form, are a pair of side flaps 29 and 30. The side flap 29 is joined to the remainder of the rear panel 11 at a line of weakness 31 and there is a second line of weakness 32 which is parallel to the line 31 that substantially separates the side flap 29 into a first or inner segment 33 and a second or outer segment 34 and facilitates folding therebetween.

The side flap 30 is likewise joined along one side thereof to the rear panel 11 at a line of weakness 35 and has a second line of weakness 36 parallel to the first line of weakness 35 and which separates the side flap 30 into a first or inner segment 37 and a second or outer segment 38. As with the other lines of weakness described herein the lines 35 and 36 allow and facilitate relative folding of adjacent elements separated by the lines of weakness.

The front panel 10 has laterally extending side flaps 41 and 42. The side flap 41 is attached to the front panel 10 at a line of weakness 43 and the side panel 42 is attached to the front panel 10 at a line of weakness 44.

As best can be seen in FIG. 4, the front panel side flap 41 is fixedly joined with the back panel side flap outer segment 34 so as to overlap therewith and to be positioned inside thereof relative to the envelope 1. The side flap 41 is secured to the segment 34 by glue or the like. Likewise the flap 42 is fixedly secured to the segment 38. In this manner the side flaps 29 and 41 form an expandable sidewall 45 and the flaps 30 and 42 form an expandable sidewall 46.

An enclosure 47 is thus formed between the front panel 10, the rear panel 11, the sidewalls 45 and 46 and the bottom strip 15. The enclosure 47 is generally completed by placing the closure flap 12 in the closed configuration thereof, as is seen in FIG. 3, with only the upper corners above the sidewalls 45 and 46 remaining open.

Each of the front panel flaps 41 and 42 have a structural extension or backing strip 49 and 50 respectively which extend beyond the lines of weakness 32 and 36 and are not secured to the segments 34 and 38 respectively. The backing strips 49 and 50 support the lines of weakness 32 and 36 and engage the inner segments 33 (see FIG. 5) and 37 when the envelope is fully expanded (FIG. 5) to help prevent the sidewalls 45 and 46 from folding outwardly relative to the envelope 1, that is to the left in FIG. 5, but rather urges the sidewalls 45 and 46 to fold inwardly into the envelope 1 upon compression.

A pocket forming intermediate strip 51 is attached to both the front panel 10 and rear panel 11 and extends from front to back of the envelope 1 between the panels 10 and 11. In particular, the strip 51, as can be seen in phantom lines in FIG. 2 and in an end view in FIG. 4, is constructed of a rectangular sheet of paper stock, stiff card or the like. The strip 51 includes three lines of weakness 53, 54 and 55 to allow folding therealong. The line of weakness 53 separates a first segment 56 from a second segment 57. The segment 53 is secured by gluing or the like to the rear panel 11. Attached to the segment 57 is a segment 58 and the two bridge between the front panel 10 and rear panel 11 folding at a line of weakness 54 which extends generally vertically therebetween allowing the segments 57 and 58 to bend relative to one another and expand or accordion with the sidewalls 45 and 46. The segment 58 is in turn connected to the segment 59 at a line of weakness 55. The segment 59 is secured to the front panel 10 by gluing or the like.

The strip 51 thereby extends between the front panel 10 and a rear panel 11 with a generally vertical orientation and with the ability to expand or compress as the envelope 1 is filled or emptied. The strip 51 also divides the enclosure of the envelope into a first comparatively small front to rear pocket 61 and a second comparatively large front to rear pocket 62. The small pocket 61 is sized and shaped to receive the container 6 therein. The pocket 62 is sized and shaped to receive a plurality of the finished photographs 5.

As used herein any directional connotations refer to the envelope as aligned in FIGS. 6, 7 and 8. That is, with the envelope 1 being generally upright and the front panel 10 and rear panel 11 being generally vertically aligned with the closure flap 12 at the upper end of the envelope. While these specific directional connotations are utilized herein to better describe the invention relative to the drawings, it is foreseen that the envelope 1 can assume a wide variety of alignments and is often used with the rear panel 11 positioned downwardly. Consequently, directional connotations as used herein are for description purposes only and are not intended to be limiting upon the scope of the invention.

The front panel 10 along with the sidewalls 45 and 46 are somewhat shorter in height as compared to the rear panel 11, as can best be seen in FIG. 2. Also, there is a cutout 65 on the upper left hand corner of the front panel 10, as is seen in FIG. 2 to allow easier access to the contents of the envelope 1 at this location by a user. The cutout 65 is especially positioned to allow a user to retrieve objects from the small pocket 61.

A keeper or locking tab 69 is integrally formed from adjoining upper portions of the front panel 10 and front side panel flap 41. In particular, the locking tab 69 includes four generally triangularly shaped sections 71 and 72 that are adjacent to one another and positioned at the top of the side flap 41 and sections 73 and 74 which are adjacent to one another and positioned at the top of the front panel 10. The segment 71 is joined to the remainder of the side flap 41 at a line of weakness 77 and to the adjoining triangular section 72 at a line of weakness 78. The triangular section 72 is joined to the next adjoining triangular section 73 by an upper portion line of weakness 79 of the line of weakness 43 whereat the side flap 41 joins the front panel 10. The section 73 is in turn joined to the next adjoining section 74 at a line of weakness 80. The section 74 is joined to the remainder of the front panel 10 at a line of weakness 81 which preferentially is positioned such that the sections 73 and 74 are generally aligned with the cutout 65 and that the start of line of weakness 81 is positioned to begin at the lowermost edge of the cutout 65. All of the lines of weakness 77, 78, 79, 80 and 81 converge to a common point 84 which is a common apex for all of the triangular sections 71, 72, 73 and 74. However, the lines 77 and 81 are not collinear.

Operation of the locking tab 69 is best seen in FIGS. 6 through 10. In FIG. 6 is seen a section of the envelope 1 showing the locking tab from the front, illustrates the locking tab 69 in an open configuration wherein it is relatively simple to remove the container 6 from the small pocket 61. In this configuration the locking tab 69 is positioned upwardly and the line of weakness 79 is collinear with the remainder of the line of weakness 43. Illustrated in FIG. 7 is the finger 86 of a user in the process of converting the locking tab 69 from the open position thereof to the locking position thereof. In FIG. 7 the locking tab is intermediate these two positions and the two segments 72 and 73 are being bent inwardly and folded along the line of weakness 79 so as to pass between the sections 71 and 74.

In FIG. 8 the locking tab 69 is seen in the locking position thereof with the sections 72 and 73 completely between the sections 71 and 74. This configuration is also seen in FIGS. 9 and 10 as well as FIG. 2. When the locking tab 69 is in the locking configuration thereof it overlays the container 6 so as to prevent the container from easily falling from the small pocket 61.

The locking tab 69 is an over center type of locking device. In particular, because the line of weakness 79 lies below the lines of weakness 77 and 78 when in the locking configuration thereof and because the front panel 10 and rear panel 11 tend to compress the locking tab 69, the locking tab 69 is generally held in place in the locking position by the overall structure of the envelope 1. Therefore, the locking tab 69 does not disengage from the locking position thereof until a user selectively reverses the process shown in FIGS. 6 through 8. It is noted that in the process of moving from the open configuration to the locked configuration of the locking tab 69, the facets or segments 72 and 73 have faces that reverse, that is in the open configuration one side of each segment 72 and 73 is in facing relationship to the other and in the closed configuration the opposite faces are in facing relationship to each other. It is also noted that in the locked configuration the line of weakness 79 is at least as low (actually slightly lower) than the lines 77 and 78 which cooperates with the segments 72 and 73 to produce the over center nature of the device which in turn helps prevent unintentional release of the locking tab 69.

During usage of the envelope 1, the envelope 1 is configured as in FIG. 1 and the photographs 5 and the container 6 are placed in the envelope 1. The locking tab 69 is pressed in place into the locking position thereof so as to hold the container 6 in the envelope 1. The closure flap 12 is closed to the position shown in FIG. 3 and the envelope 1 is then ready to be transferred to a customer. The customer reverses the process to remove the photographs 5 and the container 6.

It is to be understood that while certain forms of the present invention have been illustrated and described herein, it is not to be limited to the specific forms or arrangement of parts described and shown.

What is claimed and desired to be secured by Letters Patent is as follows:

1. An envelope comprising
   a) a front panel;
   b) a rear panel connected to the front panel along bottom edges thereof;
   c) first and second expandable side panels connecting said front and rear panels along opposite sides thereof; each of said side panels being constructed by joining a rear side flap extending from the rear panel with a front side flap extending from said front panel; for each side panel a first of said front side flap and said rear side flap including an inner section and an outer section joined by a folding line of weakness and the second of said front side flap and said rear side flap being fixedly joined to said outer section, being positioned inwardly of said line of weakness relative to said envelope, and including a backing strip extending on both sides of said line of weakness so that said expandable side panels are urged to fold inwardly with respect to the envelope when said front and rear panels are urged toward one another and said expandable side panels are restricted from folding outwardly by said backing strips;
   d) an intermediate expandable strip joining said front panel and said rear panel from front to rear and between said expandable side panels so as to form first and second pockets therebetween; and
   e) a locking tab positioned to maintain objects in said first pocket in a locking configuration thereof and to allow removal of objects from said first pocket in an open configuration thereof.

2. The envelope according to claim 1 wherein:
   a) said first of said front side flap and said rear side flap is said rear side flap.

3. The envelope according to claim 1 wherein:
   a) an upper first portion of one of said front and rear panels including first and second triangular sections joined to each other at lines of weakness;
   b) an upper portion of side panel associated with the one of said front and rear panels including third and fourth triangular sections joined to each other at lines of weakness; and
   c) each of said sections having an apex joining at a common point such that said second and third sections are joined so as to be foldable and selectively urgeable inwardly by a user as said first and fourth sections expand to allow said locking tab to realign from an open configuration thereof to a locking configuration thereof.

4. The envelope according to claim 3 wherein:
   a) the sections are sized and shaped such that a line of weakness between said third and fourth sections operably moves from the vertical to being below said apex except at said apex when said locking tab moves from the open configuration to the closed configuration thereof.

5. The envelope according to claim 3 wherein:
   a) said one of said front and rear panels is said front panel.

6. The envelope according to claim 5 wherein:
   a) said front panel includes a cutout at the top thereof and aligned with the first pocket to allow ease of use thereto;
   b) a line of weakness located whereat said first section joins a remainder of said front panel beginning near a bottom of said cutout.

7. The envelope according to claim 1 wherein:
   a) said front and rear panels are connected along the bottom edges thereof by an expandable bottom strip cooperating with said first and second expandable sides and said intermediate expandable strip to allow expansion of said envelope during usage.

8. The envelope according to claim 1 including:
   a) a closure flap joined to said rear panel for closing said envelope.

9. An envelope comprising:
   a) first and second generally rectangular face to face panels;
   b) said first and second panels being connected near outer side and bottom edges thereof to form an envelope enclosure;
   c) said first panel having a side flap of one side thereof connected to said first panel at a first line of weakness so as to allow folding of said side flap relative to said first panel;
   d) said first panel and said side flap having integral upper adjacent portions cooperating to form a locking tab having a first locking configuration positioned such that the locking tab covers a part of said enclosure and an open configuration;
   e) said first panel portion includes first and second triangular segments foldably joined at a second line of weakness;
   f) said side flap portion includes third and fourth triangular segments foldably joined at a third line of weakness; said second and third segments being joined at a fourth line of weakness; and
   g) all of said triangular segments joining at a common apex; said second and third segments being moveable between said open configuration and said locking configuration.

10. An envelope comprising:
   a) a front panel;
   b) a rear panel connected to the front panel along bottom edges thereof;
   c) first and second side panels connecting said front and rear panels along opposite sides thereof;
   d) an intermediate strip joining said front panel and said rear panel from front to rear and between said side panels so as to form first and second pockets therebetween;
   e) a locking tab including folding sections having a locking configuration and an open configuration and being positioned to maintain objects in said first pocket when in said locking configuration and to allow removal of objects from said first pocket when in said open configuration; and
   f) a closure flap joined to said rear panel and having an open position allowing access to said second pocket and a closed position covering both said first and second pockets.

11. The envelope according to claim 10 wherein:

a) said front and rear panels are connected by expandable side and bottom strips and said intermediate strip is expandable so as to allow expansion of said envelope during usage.

12. An envelope comprising:

a) a front panel;

b) a rear panel connected to the front panel along bottom edges thereof;

c) first and second side panels connecting said front and rear panels along opposite sides thereof;

d) an intermediate strip joining said front panel and said rear panel from front to rear and between said side panels so as to form first and second pockets therebetween;

e) a locking tab positioned to maintain objects in said first pocket in a locking configuration thereof and to allow removal of objects from said first pocket in an open configuration thereof;

f) an upper first portion of one of said front and rear panels including first and second triangular sections of said locking tab joined to each other at lines of weakness;

g) an upper portion of side panel associated with the one of said front and rear panels including third and fourth triangular sections of said locking tab with each of said third and fourth sections joined to the other at lines of weakness; and h) each of said sections having an apex joining at a common point such that said second and third sections are joined so as to be foldable and selectively urgeable inwardly by a user as said first and fourth sections expand to allow said locking tab to realign from an open configuration thereof to a locking configuration thereof.

13. The envelope according to claim 12 wherein:

a) the sections are sized and shaped such that a line of weakness between said third and fourth sections operably moves from the vertical to being below said apex except at said apex when said locking tab moves from the open configuration to the closed configuration thereof.

* * * * *